United States Patent [19]

Shirahata et al.

[11] 4,087,582

[45] May 2, 1978

[54] MAGNETIC RECORDING MEDIUM

[75] Inventors: Ryuji Shirahata; Tatsuji Kitamoto, both of Odawara, Japan

[73] Assignee: Fuji Photo Film Co., Ltd., Minami-ashigara, Japan

[21] Appl. No.: 520,816

[22] Filed: Nov. 4, 1974

[30] Foreign Application Priority Data

Nov. 2, 1973 Japan .................................. 48-123611

[51] Int. Cl.$^2$ ..................... H01F 10/00; G11B 5/72
[52] U.S. Cl. .................... 428/333; 427/131; 427/132; 428/336; 428/457; 428/469; 428/470; 428/471; 428/900; 360/134; 365/171
[58] Field of Search .................... 117/234–240; 428/900, 469, 476, 471, 333, 336; 427/131, 132; 360/174 TT, 134; 29/195; 274/11 E; 252/62.54, 62.55, 62.51

[56] References Cited

U.S. PATENT DOCUMENTS

| 2,907,680 | 10/1959 | Smith et al. | 360/134 |
|---|---|---|---|
| 3,029,157 | 4/1962 | Sutheim et al. | 117/240 |
| 3,464,156 | 9/1969 | Peters et al. | 29/195 |
| 3,490,946 | 1/1970 | Wolf | 117/239 |
| 3,719,525 | 3/1973 | Patel et al. | 117/239 |
| 3,790,407 | 2/1974 | Merten et al. | 117/235 |
| 3,794,519 | 2/1974 | Akashi et al. | 117/235 |
| 3,914,519 | 10/1975 | Hall et al. | 428/471 |
| 3,919,719 | 11/1975 | Wright et al. | 428/900 |
| 3,993,824 | 11/1976 | Shirahata et al. | 428/336 |

*Primary Examiner*—George F. Lesmes
*Assistant Examiner*—Stanley S. Silverman
*Attorney, Agent, or Firm*—Sughrue, Rothwell, Mion, Zinn and Macpeak

[57] ABSTRACT

A magnetic recording medium comprising a support, a magnetic recording layer comprising a thin film of a ferromagnetic metal on the support, and at least one monomolecular layer comprising a saturated fatty acid or a metal salt thereof on the surface of the magnetic recording layer.

6 Claims, 1 Drawing Figure

U.S. Patent  May 2, 1978  4,087,582
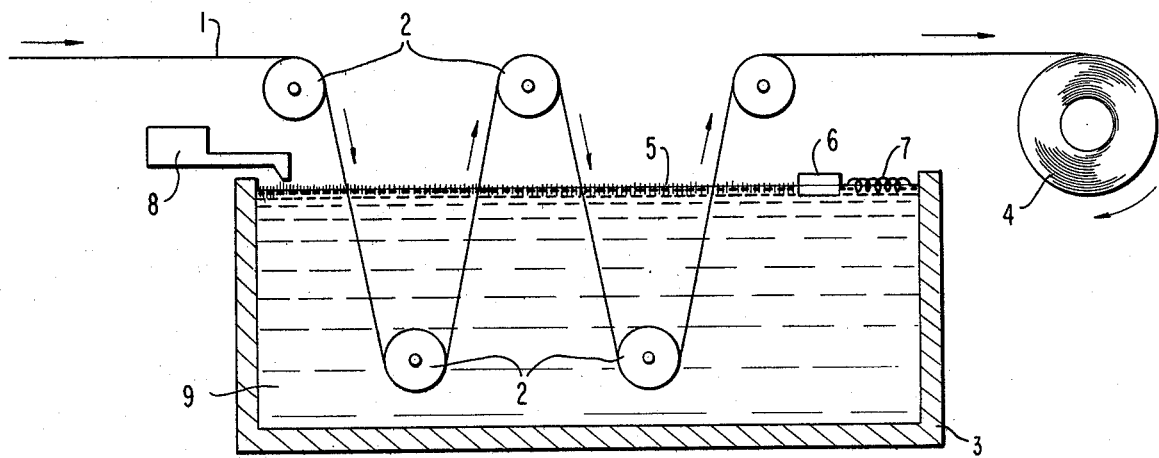

MAGNETIC RECORDING MEDIUM

BACKGROUND OF THE INVENTION

1. Field of the Invention

The present invention relates to a magnetic recording medium comprising a ferromagnetic metal thin film. More particularly, the present invention relates to a magnetic recording medium comprising a thin film of a ferromagnetic metal which has a surface layer comprising a monomolecular layer of a saturated fatty acid or a metal salt thereof.

2. Description of the Prior Art

In place of conventional magnetic recording media of the type in which powdered magnetic materials such as powders of $\gamma$-$Fe_2O_3$, Co doped $\gamma$-$Fe_2O_3$, $Fe_3O_4$, Co doped $Fe_3O_4$, and $CrO_2$ or ferromagnetic alloy powders are dispersed in an organic binder and coated, a ferromagnetic metal thin film, which is formed using a method such as electroplating, electroless-plating, sputtering, vacuum depositing, ion plating or the like, is now attracting attention as a recording medium where no binder is used, i.e., a so-called binderless type magnetic recording medium.

As one of the requirements which are required for a magnetic recording medium for use in high density recording, it has been theoretically and experimentally proposed to render its coercive force larger and its thickness thinner. Since the thickness of the non-binder type magnetic recording medium can be easily made thinner to the extent of a thickness of about 1/10th the thickness of the binder type magnetic recording medium and the saturation magnetic flux density of a non-binder type magnetic recording medium is large, hopes for the non-binder type magnetic recording medium are high. Significant problems which are encountered in a non-binder type magnetic recording medium, i.e., a magnetic recording medium comprising a ferromagnetic metal thin film, are corrosion, abrasion resistance, and travelling stability. The magnetic recording medium is subjected to a high speed relative motion with a magnetic head in the course of recording, reproduction, and erasure of a magnetic signal. In this case, the travelling must be effected smoothly and in a stable manner, and the abrasion and breakage of the magnetic recording medium due to the contact thereof with the head must be eliminated. Furthermore, a reduction in or loss of the signal recorded due to the variation with time due to corrosion and the like during the storage must be eliminated.

Since few ferromagnetic metal layers by themselves are able to endure the severe conditions encountered in the course of the magnetic recording and reproduction, various protective layers are provided on the surface of the ferromagnetic metal layer. The formation of the protective layer by electroplating of rhodium has been commercialized to some extent. In addition, a method comprising coating a lubricant; a method comprising oxidizing the surface of a ferromagnetic metal thin film containing cobalt by allowing the thin film to stand at suitable temperatures and humidities where such a cobalt containing ferromagnetic metal is used as a magnetic substance (e.g., as disclosed in U.S. Pat. No. 3,460,968); a method comprising contacting a magnetic alloy thin film with nitric acid, subjecting the thin film to a heat-treatment to thereby form an oxidized layer on the surface thereof, and permeating lubricant into the oxidized layer (e.g., as disclosed in U.S. Pat. No. 3,719,525); a method comprising vapor-depositing chromium on the surface of a ferromagnetic metal thin film in a suitable vacuum and forming a mixed layer of chromium and chromium oxide (e.g., as disclosed in U.S. Pat. No. 3,498,837); and the like are known.

By providing a protective layer using the above described methods, the corrosion resistance, abrasion resistance, and durability are improved, but the travelling property is not satisfactorily improved. The creak which takes place when a magnetic tape comprising a ferromagnetic metal thin film is applied to VTR (video tape recording) (which means that the travelling of the magnetic tape becomes unstable because of the friction of the tape with the drum of the VTR) cannot be removed. Furthermore, the thickness of the above protective layer approaches at least 0.1 $\mu$ and, in some cases, up to 1 $\mu$ depending upon the method of forming the protective layer. Thus, the clearance between the magnetic head and the magnetic recording layer is large and high density magnetic recording is rendered impossible due to the so-called spacing-loss, which results in the loss of an important feature of the non-binder type magnetic recording medium.

SUMMARY OF THE INVENTION

An object of the present invention is to provide an improved magnetic recording medium comprising a ferromagnetic metal thin film.

Another object of the present invention is to provide an improved magnetic recording medium which has excellent corrosion resistance and abrasion resistance, and furthermore is extremely excellent in travelling property.

These and other objects and advantages of the present invention will be apparent from the following description.

These objects are attained by providing at least one monomolecular layer of a saturated fatty acid or a metal salt thereof on the surface of the ferromagnetic metal thin film.

Accordingly this invention provides a magnetic recording medium comprising a support, a magnetic recording layer comprising a thin film of a ferromagnetic metal on the support, and at least one monomolecular layer of a saturated fatty acid or a metal salt thereof on the surface of the magnetic recording layer.

BRIEF DESCRIPTION OF THE DRAWINGS

The FIGURE shows an apparatus illustrating an embodiment of a method for producing the magnetic recording medium according to the present invention.

DETAILED DESCRIPTION OF THE INVENTION

The present invention provides a magnetic recording medium comprising a ferromagnetic metal thin film which has excellent corrosion resistance and abrasion resistance, and furthermore has an extremely excellent travelling property, by providing at least one monomolecular layer of a saturated fatty acid or a metal salt thereof on the surface of the ferromagnetic metal thin film formed by a method such as electroplating, e.g., as disclosed in U.S. Pat. Nos. 3,227,635; 3,578,571 and 3,637,471; etc.; electroless-plating, e.g., as disclosed in U.S. Pat. Nos. 3,138,479; 3,219,471; 3,238,061; 3,360,397; 3,446,657 and 3,549,417; etc.; gas-phase plating; sputtering; vapor-depositing, e.g., as disclosed in Japanese Patent Application (OPI) No. 2661/71, corresponding to French Pat. No. 2,079,384 and German Pat. DT-OS 2,106,543, etc.; ion plating, e.g., as disclosed in D. M. Mattox *Electrochemical Technology*, Vol. 2, No. 9 ~ 10, pages 295 ~ 298 (1964); or the like.

Since the film thickness of the monomolecular layer is about 15 to 30 A, the monomolecular layer protective film of the present invention is thinner to the extent of about 1/10th or 1/100th the thickness of conventional protective layers, and thus the spacing loss in high density recording is markedly reduced as compared with that encountered in conventional magnetic recording media.

The monomolecular layer is a layer wherein monomolecules are attached to the surface of a liquid or solid in a regular and dense arrangement, and the thickness of the layer corresponds to the size of one molecule. For instance, it is known that the thickness of the monomolecular layer of stearic acid is 25.2 A when measured using an optical method or X-ray method.

The method of forming the monomolecular layer of a fatty acid is described in, for example, Langmuir-Blodgett, Physical Review, 51, 964 (1937). That is, when a fatty acid dissolved in a volatile solvent such as benzene or the like is dropped on the surface of water, the solvent evaporates and a monomolecular layer is formed on the surface of the water. When a clear glass plate is dipped in the water and removed, the monomolecular layer of the fatty acid is transferred to the surface of the glass plate. If the procedure is repeated, a plurality of monomolecular layers are formed.

In this case, in order to increase the density of the monomolecular layer and to facilitate the transfer of the monomolecular layer to the surface of a solid, it is desired that a surface tension be applied against the monomolecular layer in a direction parallel to the plane of the monomolecular layer on the surface of the water. In the present invention, the surface tension is generally about 15 to 35 dynes/cm, with the most preferred range being 25 to 30 dynes/cm, and one technique for accomplishing this is shown in the FIGURE using means 6 and 7.

It has been found that a monomolecular layer of a fatty acid or a metal salt thereof can be uniformly and closely formed on the surface of a clean and dry ferromagnetic metal film using the Langmuir-Blodgett method and that a magnetic recording medium having such a surface layer has excellent corrosion resistance and abrasion resistance, and furthermore has an extremely excellent travelling property. Suitable solvents which can be employed are those in which the linear saturated fatty acid having 8 to 28 carbon atoms is soluble and which are also immiscible with water. Typical examples of such solvents include aromatic hydrocarbons, e.g., benzene, toluene, xylene, etc., aliphatic hydrocarbons, e.g., gasoline, kerosene, n-heptane, octane, etc., esters, e.g., butylacetate, amylacetate, etc., ketones, i.e., methyl isobutyl ketone, methyl ethyl ketone, etc., and the like.

Although the function of the surface layer is not completely clear, it is considered that the monomolecular layer is present on the surface of the ferromagnetic metal thin film in a manner in which the carboxyl group attaches to the surface of the thin film and the hydrocarbon chain is perpendicular to the surface. Thus, the hydrophobic hydrocarbon chains are densely arranged and constitute the upper portion of the protective layer. Thus, it is presumed that the hydrocarbon chain acts as a lubricant during the relative motion of the ferromagnetic metal thin film with the magnetic head, improving the travelling property, and furthermore, since the hydrocarbon chain is hydrophobic, the ferromagnetic metal thin film is resistant to the effects of humidity and has excellent weatherability.

The number of monomolecular layers to be provided is 1 or more, and the monomolecular layer can be provided to an extent such that no reduction of output due to the spacing-loss is caused, e.g., 1 layer up to about 100 layers, but it has been found that about 1 to 10 layers are sufficient. The film thickness desirably ranges from about 50 A to 3000 A.

The ferromagnetic metal thin film of the present invention is produced by forming ferromagnetic metals such as iron, cobalt, nickel, and the like, or ferromagnetic alloys such as Fe—Co, Fe—Ni, Co—Ni, Fe—Rh, Co—P, Co—B, Co—Y, Co—La, Co—Ce, Co—Pr, Co—Sm, Co—Pt, Co—Mn, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W, Co—Ni—Re, and the like by methods such as electroplating, electroless-plating, gas-phase plating, vapor depositing, sputtering, ion plating, and the like into the form of a thin film. In use as a magnetic recording medium, the film thickness ranges from about 0.05 $\mu$m to 2 $\mu$m, with the range of 0.1 $\mu$m to 0.4 $\mu$m being particularly preferred.

The above ferromagnetic metal thin film can contain Cr, Ga, As, Sr, Zr, Nb, Mo, Rh, Pd, Sn, Sb, Te, Pm, Re, Os, Ir, Au, Hg, Pb, Bi, and the like in addition.

Suitable examples of saturated fatty acids or metal salts thereof, which are capable of forming a monomolecular layer, include linear type saturated fatty acids containing about 8 to 28 carbon atoms or the alkali metal salts (Li, Na, K, etc.) or alkaline earth metal salts (Mg, Ca, Ba, etc.) thereof. Particularly preferred saturated fatty acids are those compounds containing about 13 to 21 carbon atoms, e.g., tridecanoic acid, tetradecanoic acid (myristic acid), pentadecanoic acid, hexadecanoic acid (palmitic acid), heptadecanoic acid (margaric acid), octadecanoic acid (stearic acid), nonadecanoic acid, eicosanoic acid (arachic acid), and heneicosanoic acid, including the Li, Na, K, Mg, Ca, Ba, etc., salts thereof. Particularly preferred compounds are linear type saturated fatty acids containing 14 to 18 carbon atoms.

The ferromagnetic metal thin film produced by a method such as plating or the like, when allowed to stand as it is, is often confronted with various problems, e.g., unstable travelling due to the friction of the thin film with the magnetic head, damage due to scratching, and a remarkable reduction in the output of the magnetic recording due to the attachment and accumulation of shavings on the magnetic head. Furthermore, when the ferromagnetic metal thin film is exposed to high temperatures and high humidities for a long period of time, the surface properties of the ferromagnetic metal thin film are deteriorated due to actions such as the decomposition of the plated metal followed by the formation of hydroxides, corrosion, and the like, and furthermore the saturation magnetic flux density is markedly reduced. A thin film so deteriorated cannot be used as a magnetic recording medium.

The ferromagnetic metal thin film provided with a monomolecular layer of a fatty acid on the surface thereof as a protective layer in accordance with the present invention has improved abrasion resistance to the magnetic head and has excellent travelling stability. Furthermore, the deterioration of the ferromagnetic metal film is improved even in the weather testing at high temperatures and high humidities.

The present invention will be described in greater detail by reference to the following examples. Unless otherwise indicated, all parts, percents, ratios and the like are by weight.

EXAMPLE 1

A polyethylene terephthalate film having a thickness of 25 μ was placed in a vacuum vapor-deposition apparatus, and an alloy comprising 75% by weight of Co and 25% by weight of Ni was vapor-deposited on the film in a thickness of 0.3 μm from an evaporation source filament thereof in a vacuum of $5.0 \times 10^{-6}$ Torr. A solution prepared by dissolving palmitic acid in benzene in a proportion of 0.005 g per 100 ml was dropped on the surface of water to form a monomolecular layer thereon, and furthermore, in order to apply a constant surface tension (surface tension: 29.5 dynes/cm) to the monomolecular layer on the surface of the water to make the layer compact, oleic acid was dropped on the surface. The Co—Ni deposited film was dipped in the water and removed. The procedure was repeated three times, and thus 5 monomolecular layers were formed on the vapor-deposited film. In this case, no monomolecular layer was formed on the vapor-deposited film in the first dipping. The thickness of the thus formed protective layer was 112 A when measured with a multiple interference film thickness gauge.

The ferromagnetic metal thin film provided with the protective layer as produced above and a ferromagnetic metal thin film without a protective layer were allowed to stand under the conditions of a temperature of 60° C and a humidity of 90% for 100 hours. With the former thin film, the initial saturation magnetic flux density of 14,800 Gauss was reduced to 12,700 Gauss, while with the latter thin film, the initial saturation magnetic flux density of 14,800 Gauss was reduced to 10,500 Gauss.

EXAMPLE 2

A Co—P magnetic film (Co: 98%; P: 2%) was provided on a polyethylene terephthalate film tape having a width of ½ inches and a thickness of 25 μm in a thickness of 0.25 μm by electroplating in a continuous plating apparatus using the following plating solution and under the following plating conditions. As the pre-treating solution for the electroless-plating, Sumer Sensitizer and Schumer Activator produced by Japan Kanizen Co., Ltd. were used.

| Plating Solution | Quantity (g/l) |
|---|---|
| Cobaltous Chloride ($CoCl_2 \cdot 6H_2O$) | 9.5 |
| Sodium Hypophosphite ($NaH_2PO_2 \cdot H_2O$) | 5.3 |
| Ammonium Chloride | 10.7 |
| Citric Acid | 26.5 |
| Boric Acid | 30.9 |
| Plating Condition | |
| pH: 7.5 | |
| Solution Temperature: 80° C | |

Furthermore, on the Co—P electroless-plated magnetic film was attached 3 monomolecular layers of stearic acid using the apparatus as illustrated in the FIGURE. Referring to the FIGURE, a magnetic recording tape 1 passed through a drying stage after the electroless-plating was introduced into a protective layer forming tank 3 by means of a guide roller 2, and after a protective layer comprising monomolecular layers was formed, the magnetic recording tape 1 was rolled around a rolling roller 4. The protective layer forming tank 3 was filled with water 9, and on the surface of the water was formed a monomolecular layer 5, which was transferred to the magnetic recording tape 1. A fatty acid was continuously fed through a nozzle 8, and a constant surface tension was applied to the monomolecular layer 5 by means of a barrier 6 and a spring 7. In the case of stearic acid, a suitable surface tension was 30 dynes/cm.

The thus produced electroless-plated tape having a monomolecular protective layer was placed in a small sized VTR equipped with a ferrite head. The travelling was smooth, a stable output was obtained, and the surface was not damaged.

The tape having the protective layer and a tape without the protective layer were allowed to stand under the conditions of a temperature of 60° C and a humidity of 90% for 100 hours. With the former tape, the initial saturation magnetic flux density of 13,200 Gauss was reduced to 11,000 Gauss, while with the latter tape, the initial saturation magnetic flux density of 13,200 Gauss was reduced to 9,800 Gauss.

EXAMPLE 3

A Cu electrically conductive film was vapor-deposited in a thickness of 0.3 μ on a polyethylene terephthalate film sheet having a thickness of 25 μm. On the thus vapor-deposited conductive film, a ferromagnetic thin film of Co—Ni—Cu (Co: 67%; Ni: 32%; Cu: 1%) was formed in a thickness of 0.3 μm by electro-plating using the following plating solution and under the following condition.

| Plating Solution | | |
|---|---|---|
| Nickel Sulfate ($NiSO_4 \cdot 7H_2O$) | 30 | g/l |
| Nickel Chloride ($NiCl_2 \cdot 6H_2O$) | 5 | g/l |
| Cobaltous Sulfate ($CoSO_4 \cdot 7H_2O$) | 30 | g/l |
| Cobaltous Chloride ($CoCl_2 \cdot 6H_2O$) | 5 | g/l |
| Copper Sulfate ($CuSO_4 \cdot 5H_2O$) | 0.25 | g/l |
| Boric Acid | 7.5 | g/l |
| Formaldehyde | 0.1 | ml/l |
| Sodium 1,5-Naphthalene Disulfonate | 0.25 | g/ |
| Plating Condition | | |
| pH: 5.0 | | |
| Solution Temperature: 40° C | | |

On the electroplated magnetic layer as prepared above, 5 monomolecular layers of stearic acid were adhered. The thickness of the monomolecular protective layer was 250 A when measured with a multiple interference film thickness gauge. The thus produced electroplated sheet having the monomolecular protective layer was placed in a VSR (video sheet recorder). The rolling was smooth, and the sudden reduction of the output which is observed with a magnetic sheet without a protective layer, was not observed. Furthermore, when the magnetic sheet was dipped in water for 24 hours, there was no formation of pin-holes which are observed with a magnetic sheet without a protective layer, and the surface retained its good properties.

In the above Examples, a polyethylene terephthalate film was used as a support of a ferromagnetic metal thin film, but plastic supports such as those of polyvinyl chloride, cellulose triacetate, polycarbonate, and polyimide; metals such as aluminum and brass; glass, ceramics, and the like can be used. The support can be in the form of a tape, sheet, card, disk, or drum. In forming a monomolecular layer on the surface of the water, Li, Na, K, Mg, Ba, Ca or a like ion is dissolved in water to thereby form a monomolecular layer comprising a metal salt of a fatty acid.

Furthermore, in preparing a protective layer comprising a plurality of monomolecular layers, the kind of each of the monomolecular layers can be changed, e.g., a first layer of stearic acid and a second layer of palmitic acid.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support, a magnetic recording layer from about .05 μm to 2 μm thick comprising a thin film of a ferromagnetic metal on said support, and one to about 100 monomolecular layers of a linear saturated fatty acid containing about 8 to 28 carbon atoms or a metal salt thereof on the outer surface of said magnetic recording layer, each of said one to about 100 monomolecular layers having a thickness of about 15 A to 30 A.

2. The magnetic recording medium according to claim 1, wherein the metal salt is selected from the group consisting of an alkali metal salt and an alkaline earth metal salt.

3. The magnetic recording medium according to claim 1, wherein the magnetic recording layer is formed by a method selected from electroplating, electroless plating, gas-phase plating, vapor depositing, sputtering, or ion plating.

4. The magnetic recording medium according to claim 1, wherein a monomolecular layer is formed on said magnetic recording layer by transfer thereof onto the magnetic recording layer from the surface of water.

5. The magnetic recording medium according to claim 4, wherein the monomolecular layer is formed on the surface of water by dropping a volatile solvent having dissolved therein the linear fatty acid or metal salt thereof onto the water surface and evaporating the solvent.

6. The magnetic recording medium according to claim 5, wherein to facilitate transfer of the monomolecular layer from the surface of water, a surface tension of about 15 to 35 dynes/cm is applied against the monomolecular layer in a direction parallel to the plane of the monomolecular layer on the surface of the water.

* * * * *